US009165179B1

(12) United States Patent
Schpok et al.

(10) Patent No.: US 9,165,179 B1
(45) Date of Patent: Oct. 20, 2015

(54) FEATURE REDUCTION BASED ON LOCAL DENSITIES FOR BUNDLE ADJUSTMENT OF IMAGES

(71) Applicant: Google Inc., Mountain View, CA (US)

(72) Inventors: Joshua Sam Schpok, Milpitas, CA (US); Michael Hongmai Lin, Mountain View, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/586,164

(22) Filed: Dec. 30, 2014

Related U.S. Application Data

(63) Continuation of application No. 13/475,710, filed on May 18, 2012, now Pat. No. 8,965,107.

(51) Int. Cl.
| | | |
|---|---|---|
| *G06K 9/46* | (2006.01) | |
| *G06T 7/00* | (2006.01) | |
| *G06K 9/00* | (2006.01) | |
| *G06K 9/62* | (2006.01) | |
| *G06T 5/10* | (2006.01) | |

(52) U.S. Cl.
CPC .......... *G06K 9/00201* (2013.01); *G06K 9/6202* (2013.01); *G06T 5/10* (2013.01)

(58) Field of Classification Search
CPC .......... G06K 9/00201; G06K 2209/40; G06T 7/0018; G06T 7/0022; G06T 7/0028; G06T 7/004; G06T 7/0042; G06T 2207/30244
See application file for complete search history.

(56) References Cited

U.S. PATENT DOCUMENTS

| | | | |
|---|---|---|---|
| 5,825,915 A | 10/1998 | Michimoto et al. | 382/154 |
| 5,845,006 A | 12/1998 | Sumi et al. | 382/154 |
| 6,466,255 B1 | 10/2002 | Kagita et al. | 348/42 |
| 6,674,893 B1 | 1/2004 | Abe et al. | 382/154 |
| 6,912,293 B1 | 6/2005 | Korobkin | 382/100 |
| 6,970,593 B2 | 11/2005 | Furukawa | 382/154 |
| 7,015,951 B1 | 3/2006 | Yoshigahara et al. | 348/207.99 |
| 7,158,664 B2 | 1/2007 | Nagaoka et al. | 382/154 |
| 7,193,633 B1 | 3/2007 | Reinhardt et al. | 345/629 |

(Continued)

OTHER PUBLICATIONS

Labatut et al, Efficient Multi-View Reconstruction of Large-Scale Scenes Using Interest Points, Delaunay Triangulation and Graph Cuts, Computer Vision, IEEE $11^{th}$ International Conference, 2007. Retrieved on [Jan. 28, 2014], Retrieved from the internet: URL:http://www.normalesup.org/~labatut/papers/iccv2007-efficient-multiview.pdf.

(Continued)

*Primary Examiner* — Andrew W Johns
(74) *Attorney, Agent, or Firm* — Dority & Manning, P.A.

(57) ABSTRACT

Methods, systems, and computer program products are provided for determining camera parameters and three dimensional locations of features from a plurality of images of a geographic area. These include, detecting features in the plurality of images where each of the images cover at least a portion of the geographic area, comparing the detected features between respective ones of the images to determine a plurality of matched features, selecting a subset of the plurality of matched features and determining the camera parameters and the three dimensional positions of one or more of the detected features using the selected subset. The respective matched features are selected depending on a quantity of other matched features in proximity to the respective matched features.

20 Claims, 8 Drawing Sheets

(56) References Cited

U.S. PATENT DOCUMENTS

| | | | |
|---|---|---|---|
| 7,593,552 B2 | 9/2009 | Higaki et al. | 382/118 |
| 7,720,276 B1 | 5/2010 | Korobkin | 382/154 |
| 2003/0091228 A1 | 5/2003 | Nagaoka et al. | 382/154 |
| 2004/0032970 A1 | 2/2004 | Kiraly | 382/103 |
| 2005/0089212 A1 | 4/2005 | Mashitani et al. | |
| 2005/0094869 A1 | 5/2005 | Yoda et al. | 382/154 |
| 2005/0128212 A1 | 6/2005 | Edecker et al. | 345/582 |
| 2005/0212794 A1 | 9/2005 | Furukawa et al. | 345/419 |
| 2009/0141020 A1 | 6/2009 | Freund et al. | 345/419 |
| 2009/0144668 A1 | 6/2009 | Yeh | 715/863 |
| 2009/0179895 A1 | 7/2009 | Zhu et al. | 345/424 |
| 2009/0244062 A1 | 10/2009 | Steedly et al. | 345/420 |
| 2009/0274362 A1 | 11/2009 | Sasakawa et al. | 382/154 |
| 2011/0096083 A1 | 4/2011 | Schultz | 345/583 |
| 2011/0187716 A1 | 8/2011 | Chen et al. | 345/427 |
| 2014/0147032 A1 | 5/2014 | Yous et al. | G06T 7/2033 |

OTHER PUBLICATIONS

Slabaugh, "Multi-View 3D Scene Reconstruction Using Arbitrarily Positioned Cameras", Qualifying Examination Report, Georgia Institute of Technology, 2000. Retrieved on [Jan. 28, 2015], Retrieved from the Internet: <URL:http://citeseerx.ist.psu.edu/viewdoc/download?doi=10.1.1.33.5091&rep=rep1&type=pdf>.

Tung et al, Complete Multi-View Reconstruction of Dynamic Scenes from Probabilistic Fusion of Narrow and Wide Baseline Stereo, Computer Vision, IEEE $12^{th}$ International Conference, 2009. Retrieved on [Jan. 28, 2015], Retrieved from Internet: <URL:http://www.normalesup.org/~labatut/papers/iccv2007-efficient-multiview.pdf.

FEATURE REDUCTION BASED ON LOCAL DENSITIES FOR BUNDLE ADJUSTMENT OF IMAGES

BACKGROUND

1. Field

This disclosure relates to bundle adjusting images.

2. Background

Applications can use multiple photographic images of a geographic area to create or update a three-dimensional (3D) representation of the area and of particular structures and other points of interest in that geographic area. For example, oblique imagery of a city area taken from an aircraft may be used to generate a three-dimensional view of city streets, buildings, and other points of interest. In general, multiple images from a set of oblique images overlap an area. In order for these multiple images to be used in generating an accurate representation of the area in 3D, the images are "bundle adjusted." Bundle adjusting is a technique of determining camera parameters for individual images so that the objects in the images are accurately represented in a corresponding 3D representation. Bundle adjusting imagery over a large area, such as that performed for map and geographic imagery applications, can be highly resource intensive.

As the use of such applications becomes more frequent, the scope (e.g., the size of the geographic area to which the bundle adjustment applies) and the frequency of updates of such geographic representations increase, and, as a result, impose a heavy processing burden. Bundle adjusting is, therefore, often performed in a distributed manner across several processing nodes of a network. In one approach, a group of overlapping or adjacent images is assigned to each processing node, and their individual results are combined.

However, for reasons including the propagation of the effect of a bundle adjustment in one subarea to other parts of the coverage area through overlapped images and the like, calculating bundle adjustments separately for different areas may result in inaccuracies.

SUMMARY OF EMBODIMENTS

Disclosed embodiments reduce the processing load associated with bundle adjusting images by processing the input of image features to reduce extraneous image features based upon localized distributions of the image features across the coverage area. Methods, systems, and computer program products are provided for determining camera parameters and three dimensional locations of features from a plurality of images of a geographic area. The methods, systems, and computer program products include, detecting features in the plurality of images where each of the images cover at least a portion of the geographic area, comparing the detected features between respective ones of the images to determine a plurality of matched features, selecting a subset of the plurality of matched features, and determining the camera parameters and the three dimensional positions of one or more of the detected features using the selected subset. The respective matched features are selected depending on a quantity of other matched features in proximity to the respective matched features.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

The present disclosure is generally directed to bundle adjusting geographic imagery to determine camera parameters associated with images and 3D locations of points of interest of various objects in the respective images. Bundle adjusting is conventionally used in many applications in many feature-based 3D reconstruction techniques.

Embodiments disclosed herein pre-process image features that are provided as input to the bundle adjustment calculation of determining the adjustments to be made to the respective camera positions and 3D positions of features and/or objects represented in the images.

According to an embodiment, the set of features that are input to the bundle adjustment process is reduced to eliminate excessive features, thereby reducing the computational overhead associated with the bundle adjusting. By reducing the number of features to be considered, the bundle adjustment may now be executed in a single processing node instead of over multiple processing nodes distributed across a network Executing the bundle adjustment computation on fewer processing nodes can improve accuracy, as well as efficiency, of the computation due to the reduced requirements for merging the separately computed adjustments. Embodiments may also distribute the reduced features to be considered in a more equal manner throughout the coverage area, so that, instead of having numerous features to be matched in one area and having none or almost none in a second area, even some of the relatively remote areas can be accurately placed in a 3D representation of the geographic area. Embodiments may remove from consideration those features that are least effective for bundle adjustment in subareas of the coverage area in order to obtain the set of reduced features. A more equal distribution of the features over the coverage area may lead to more consistent bundle adjustments, and consequently yield a higher quality 3D representation of the geographic area.

Figure 1A:
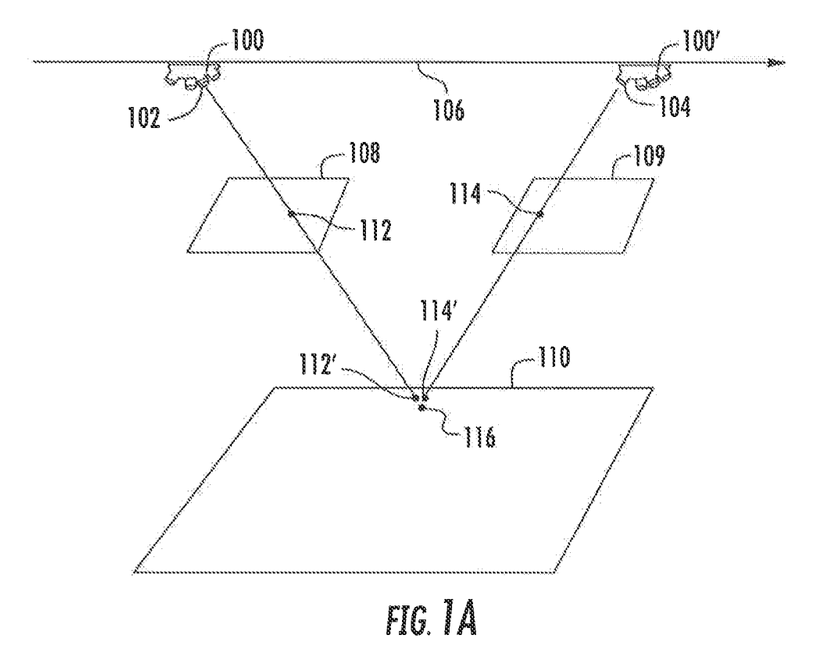
FIG. 1A is a diagram illustrating how oblique imagery of a geographic area is used to determine the 3D position of features or objects.

FIG. 1A illustrates an environment in which bundle adjustment may be used. A camera rosette 100 is attached to an aircraft (not shown) that moves along a path 106. Camera rosette 100 may have a plurality of cameras configured to capture oblique imagery of geographic areas. In some embodiments, rosette 100 may, in addition, include a camera to capture a nadir view of the geographic area. The individual cameras, such as cameras 102 and 104 of rosette 100, have fixed locations and orientations relative to each other. Camera rosette 100 captures images 108 and 109 of overlapping areas of geographic area 110 at different locations along a path 106. Image 108 is captured at a first location as illustrated to the left of FIG. 1A using a camera 102 of rosette 100. Subsequently, rosette 100 moves along path 106 and, at a second location 100', captures image 109 using a second camera 104. Feature 116 located in geographic area 110 is represented in images 108 and 109, respectively as features 112 and 114.

With each captured image, such as images 108 and 109, camera parameters associated with the image may be stored. Camera parameters include camera extrinsic parameters, such as position and orientation of the camera, and intrinsic parameters, such as principal point location and focal length. However, the camera parameters, as determined by the camera and/or rosette at the time of image capture, may not be accurate due to factors, such as, the movement of the rosette and differences in the firing intervals of respective cameras in the rosette. Herein, the camera parameters determined at the time of image capture are referred to as approximate camera parameters.

When using images 108 and 109 to determine the 3D location of feature 116, features 112 and 114 are projected to the surface 110. However, projecting features on to a surface using the approximate camera parameters determined at the time of image capture, may have the respective features in locations different from the actual observed 3D location of that object. The difference between the predicted location of the object or feature, such as that predicted using the approximate camera parameters, and the actual observed location of the object is referred to as "residual error." Bundle adjustment iteratively improves the predicted locations of features to minimize the residual error of the represented features, and accordingly determines refined camera parameters associated with the respective images.

Figure 1B:
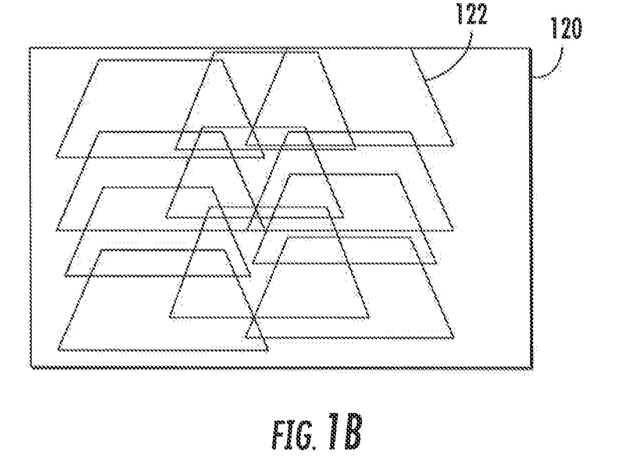
FIG. 1B illustrates an exemplary layout of individual oblique images of a sequence of images over a coverage area.

FIG. 1B illustrates an exemplary layout of individual oblique images 122 of a sequence of oblique images over a coverage area 120. As illustrated, the oblique images may have substantial areas of overlap, and a point in coverage area 120 may have none, or one or more oblique images covering it.

Figure 2A:
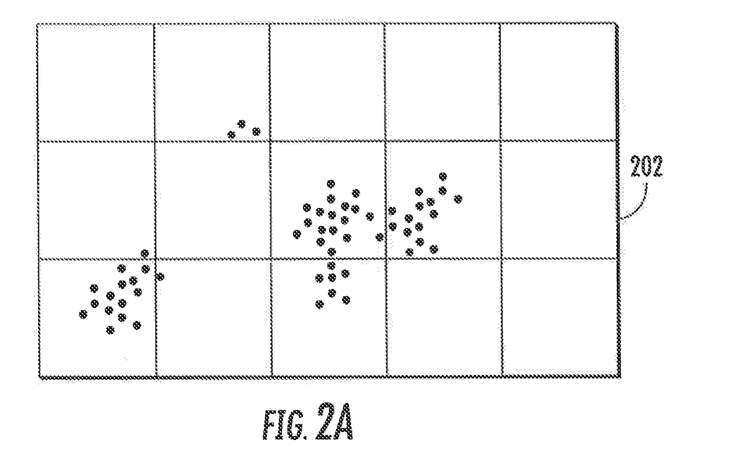
FIGS. 2A and 2B show exemplary before and after illustrations of the distribution of features throughout the area, in accordance with an embodiment.
Figure 2B:
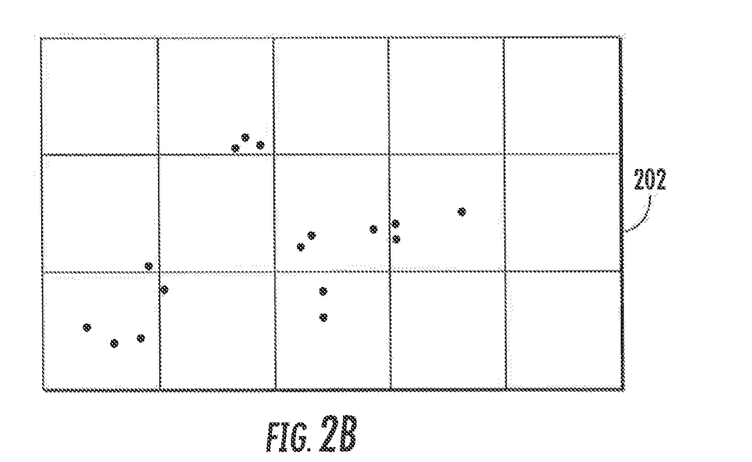

FIGS. 2A and 2B show exemplary distributions of features throughout a coverage area 202 before and after the reduction of features, in accordance with an embodiment. Coverage area 202 is partitioned to rectangular subareas (e.g., partitions) of a predetermined size. As illustrated in FIG. 2A, before the reduction of features in accordance with an embodiment, the number of features to be considered in the respective partitions vary from none to more than fifteen. In some embodiments, variations may be encountered from none to even several thousand features in a single partition. FIG. 2B illustrates the distribution of features to be considered after the features are processed for reduction in accordance with an embodiment. As illustrated, the variation in the number of features to be considered in each partition has been reduced to 0-3. The reduction of features according to embodiments, thus, result in equally or substantially equally distributing the features among the partitions. Distributing the features substantially equally among the partitions may include determining a maximum per partition number of features to be accommodated, and culling features from partitions that have more than the determined maximum per partition number of features. The resulting feature distribution will have a reduced number of total features throughout the coverage area, and the remaining features will be distributed among the partitions so that the variance among the numbers of features in respective partitions is limited to the maximum per partition number of features.

Figure 3:
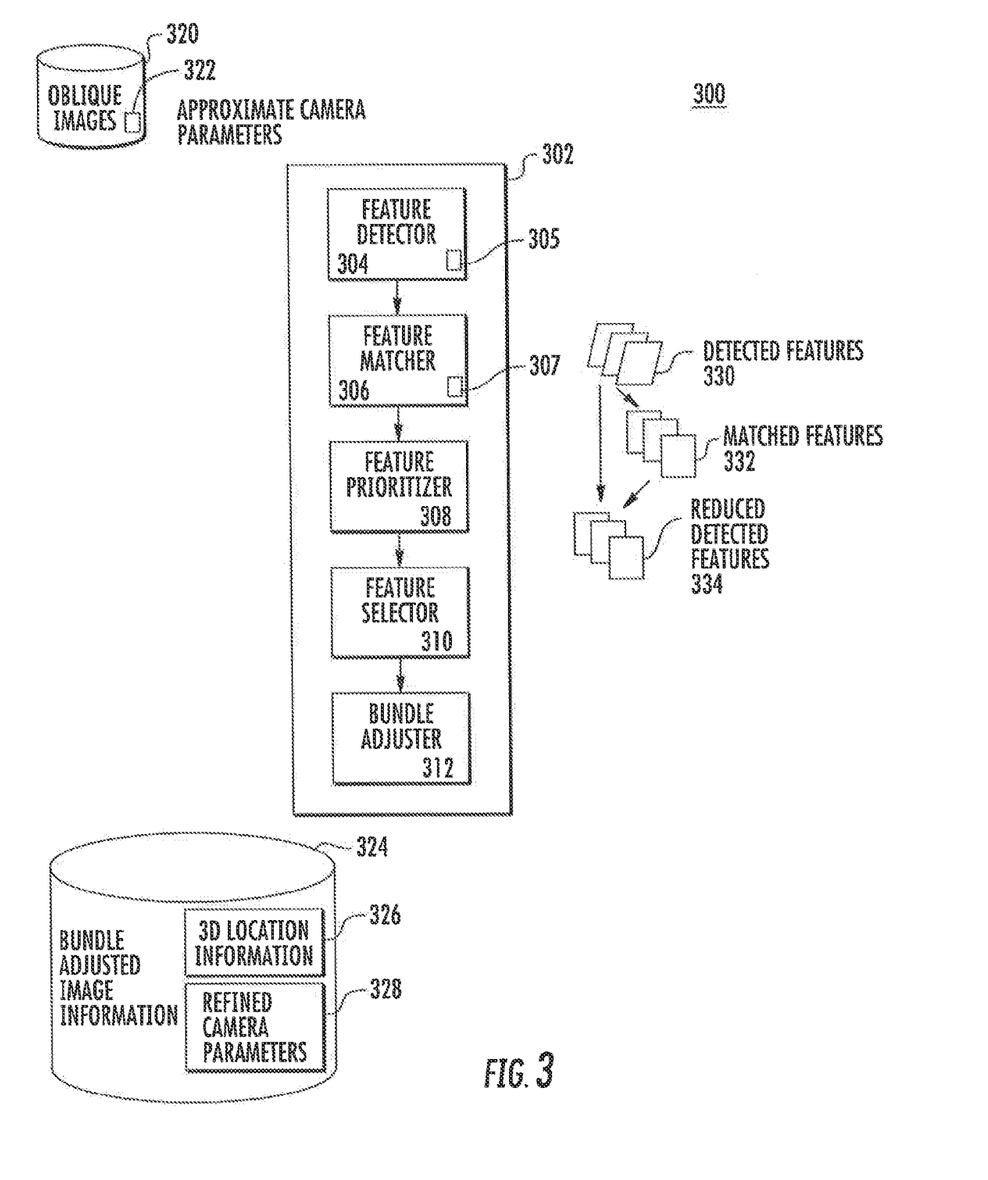
FIG. 3 illustrates a system for reducing image features for bundle adjusting images, in accordance with an embodiment.

FIG. 3 illustrates a system 300 for bundle adjusting based upon reduced image features, in accordance with an embodiment. System 300 comprises a reduced feature bundle adjuster 302 that operates to process input images to select a reduced set of image features that are then used in a bundle adjustment to determine camera parameters and/or 3D positions of various features in the images. Reduced feature bundle adjuster 302 may comprise a feature detector 304, a feature matcher 306, a feature prioritizer 308, a feature selector 310, and a bundle adjuster 312.

Feature detector 304 operates to detect image features in input images. According to an embodiment, the input images may be from a database of oblique images 320. The oblique images may have been obtained using a camera rosette attached to an aircraft. The images may, for example, cover a geographic area such as a large city. In addition to the oblique images, the input to the reduced feature bundle adjuster 302 may include approximate camera parameters 322. Approximate camera parameters 322 may be recorded by the camera rosette and/or camera at the time of capture of the respective images. As noted above, the approximate camera parameters, may include inaccuracies due to reasons, such as, the movement of the camera rosette and the variations in capture times between the cameras in the same rosette.

The output of reduced feature bundle adjuster 302 may be bundle adjusted image information 324. Bundle adjusted image information 324 includes the calculated 3D locations of objects information 326 and refined camera parameters 328. The calculated 3D location of objects information 324 includes the location of 3D objects represented in the input oblique images as they are adjusted by the bundle adjustment process. Refined camera parameters 328 may include approximate camera parameters 322 after they have been processed through bundle adjustment.

Feature detector 304 may detect any number of features in each image. Feature detection may be based upon any conventional or new technique. An exemplary feature detection technique is a conventional technique referred to as scale invariant feature (SIFT) detector. The detected features 330 may be stored in a memory or other storage (not shown in FIG. 3) to be further processed. Feature detector 304 may also include a feature detection sensitivity adjuster 305 that operates to adjust the sensitivity level associated with feature detection. According to an embodiment, feature detector 304 and feature detection sensitivity adjuster 305 may operate to determine a detection confidence associated with each detected feature, where the detection confidence of the feature is the lowest level of sensitivity of the feature detector at which that feature is detected.

Feature matcher 306 operates to match corresponding features between images. According to an embodiment, feature matching may be performed based upon matching feature vectors representing the various detected features. The matched features 332, may be derived from detected features 330, and may be stored in a memory or other storage (not shown in FIG. 3) to be further processed. Feature matcher 306 may also include a feature match confidence determiner 307 that operates to determine a match confidence associated with each matched feature, where the match confidence of a feature may be based upon a degree of match between that feature and at least one corresponding feature from another image.

Feature prioritizer 308 operates to prioritize the features. According to an embodiment, the prioritization can be based upon characteristics of the matched features, such as, but not limited to, the number of images in which the feature appears, the density of other features in proximity of the feature, and the like.

Feature selector 310 operates to select matched features based upon criteria including the priority of the features determined by feature prioritizer 308. In embodiments, the selection criteria can also include, but are not limited to, a number, or a range, of feature points to be selected per unit area, and substantially uniform distribution of features over the area. By selecting feature points according to the priority, and in some embodiments according to additional criteria, feature selector 310 may cull extraneous features that are considered less useful to improve the bundle adjustment process.

Bundle adjuster 312 operates to take as input the reduced set of matched features from feature selector 310, and to determine the 3D positions of image objects and to determine camera parameters. Bundle adjuster 312 may use any conventional or other technique to bundle adjust based upon the input images and the reduced features that are provided as input. In contrast to conventional systems, disclosed embodiments improve the accuracy and efficiency of the bundle adjustment by reducing the input number of features, selectively using the more effective features for bundle adjustment, and more equally distributing the input features over the coverage area.

Figure 4:
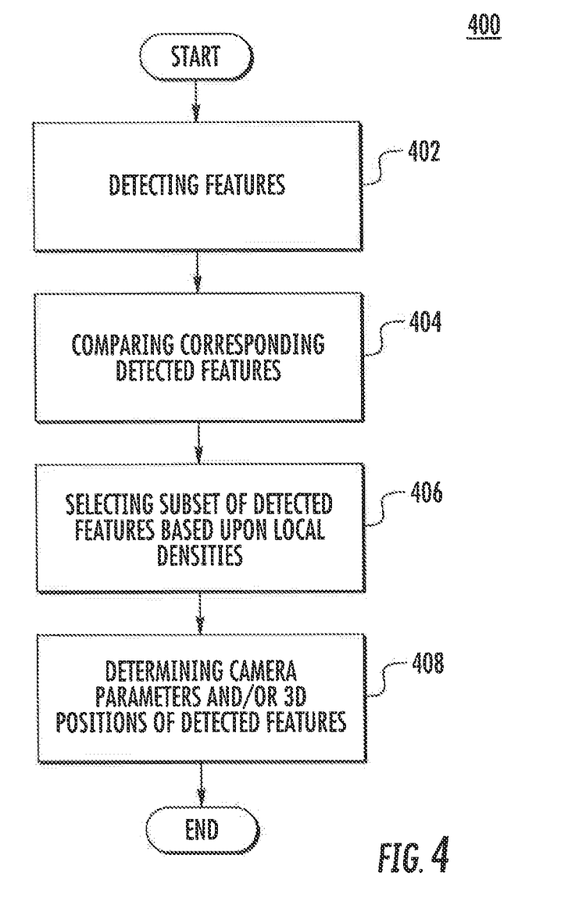
FIG. 4 illustrates a method for reducing image features in images to be bundle adjusted, according to an embodiment.

FIG. 4 illustrates a flowchart of a method 400 to perform bundle adjustment using reduced image features, according to an embodiment. Method 400 can be used, for example, in reduced feature bundle adjuster 302 to generate bundle adjusted image information 324 including refined camera parameters 328 and adjusted 3D location information 326. Method 400 may not require all of the steps 402-408 and may not require that the steps 402-408 are performed in the order shown.

At step 402, image features are detected. According to an embodiment, a plurality of digital images of a geographic area is input to the image feature detection. The images may be oblique imagery of any large geographic area, captured from an aircraft. For any image in the plurality of images, there may be one or more other images that at least partially overlaps with the image.

The feature detection may be performed using any conventional or other feature detection technique. The detected features may include, but are not limited to, edges, points, blobs and ridges.

According to an embodiment, the feature detector may have a configurable sensitivity level. The number of features detected when the detector is in a highly sensitive mode may be much greater in many geographic areas than the number of features detected for the same area when the detector in a less sensitive mode. In some geographic areas with hard to detect features, a highly sensitive feature detector may detect at least one feature whereas less sensitive detectors may not detect any features. According to an embodiment, the feature detector may associate each feature with the lowest sensitivity of the feature detector at which that feature was detected. A larger number of features may provide greater opportunities to match images, and a greater number of matching features to use in bundle adjusting. However, as the number of detected features increases the computing requirements can significantly increase, both in terms of the processing power required and memory requirements.

At step 404, corresponding features among separate images are compared in order to determine whether they represent the same feature in the geographic area. The features in separate images that represent the same geographic feature may be referred to as "matching features." Matching features may be determined using any feature matching technique such as, but not limited to, edge matching, contour matching, or object recognition technique. In embodiments that use oblique imagery from aircraft as input, the number of matching features may be large because of the high amount of overlap among images. According to an embodiment, A degree (e.g., strength) of the match between two corresponding features from two images may be determined based upon the type and/or number of matching elements from the respective feature vectors.

At step 406, a subset of the matched features is selected based upon local densities of features in the coverage area. The subset comprises a reduced number of matched features. According to an embodiment, the number of features in the subset is determined so that the bundle adjustment for the entire area of coverage can be performed on one processing node. The selection of features for the subset may be performed by culling extraneous features from areas that have high densities of features relative to other areas. Moreover, the features for the subset can be selected so as to distribute the selected features substantially evenly over the coverage area. According to an embodiment, a maximum total number of features is determined, and culling is performed to reduce the features using local density information throughout the coverage area to reduce the variance of the numbers of features in each local area of the coverage area. In addition, the criteria for selecting features for the subset can include a priority for each feature so that the best features in local areas are preserved without being culled. Moreover, the selection of features may be based upon achieving an equal or substantially equal distribution of features across the coverage area. Selection of the subset is further described below in relation to FIG. 5.

At step 408, the determined subset of features are input to be bundle adjusted. Based upon the number of features (after the culling) to be bundle adjusted, and the underlying processing capabilities of the computing resources, the bundle adjustment may be configured to be performed on one computing node. In other embodiments, more than one node may be used to perform the bundle adjustments. However, the culling of extraneous features in step 406 may have reduced the number of features to be bundle adjusted to a maximum total number, so that the bundle adjustment calculation can be performed on one computer. According to an embodiment, the bundle adjustment operates to minimize the residual error between the image locations of observed and predicted image points, which is expressed as the sum of squares of a large number of nonlinear, real-valued functions. According to an embodiment, a known technique, such as, Levenberg-Marquardt can be used for the minimization.

Figure 5:
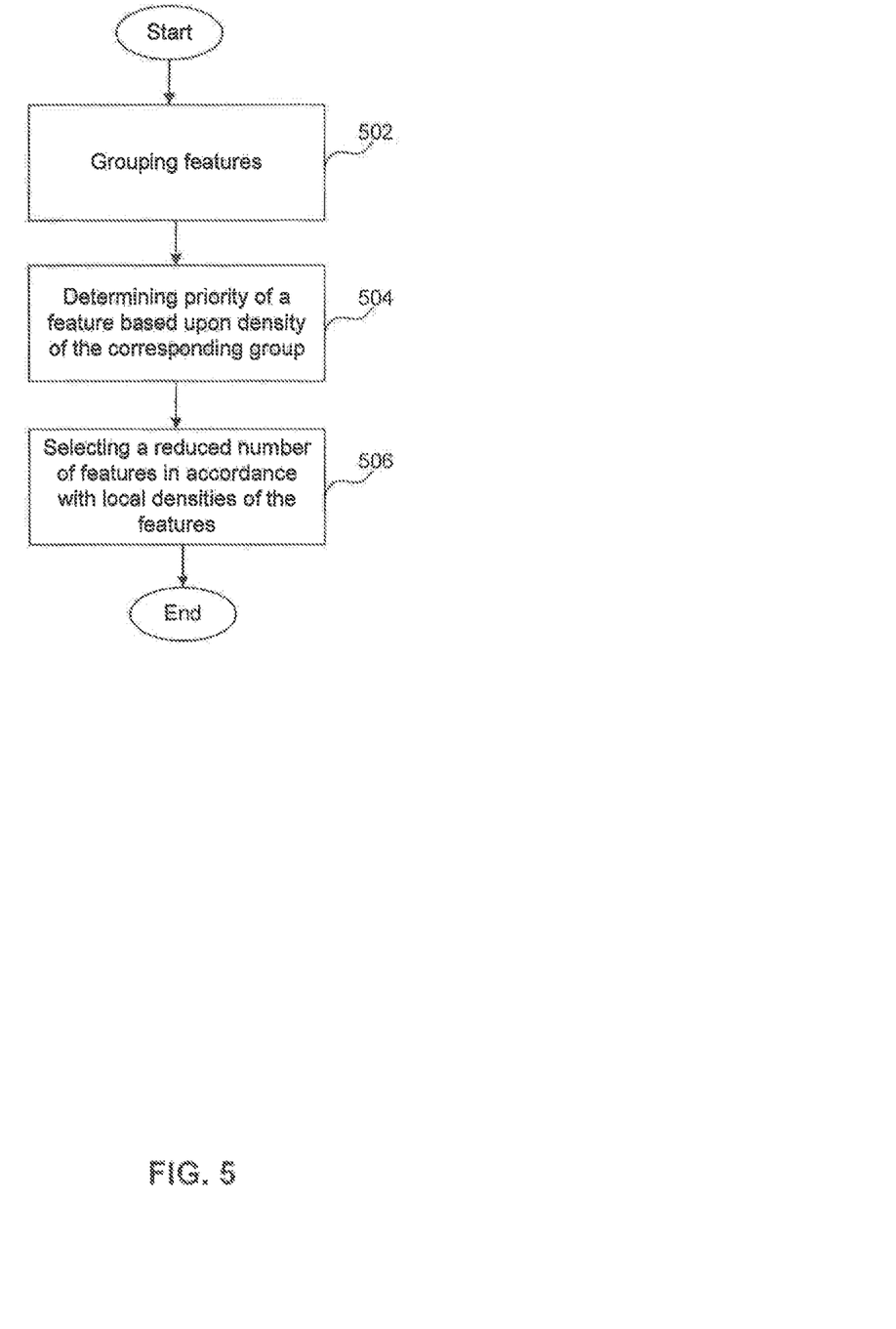
FIG. 5 illustrates a method for selecting a subset of the image features to be bundle adjusted, according to an embodiment.

FIG. 5 illustrates a method 500 to select a reduced subset of matched features, in accordance with an embodiment. Method 500 can be used, for example, in performing step 406 of method 400. Method 500 may not require all of the steps 502-506 and may not require that the steps are performed in the illustrated order.

At step 502, the detected features are grouped. The grouping of features is performed in order to subsequently select features that are substantially equally distributed throughout the coverage area. Therefore, the grouping may be based upon a geographic partitioning of the coverage area. An exemplary partitioning is described below in relation to FIG. 6. The grouping of the features enables identifying localized areas in which detected features are highly concentrated.

At step 504, a priority is assigned to one or more features in each group by comparing the one or more features to other features in the group. As described above, one or more characteristics of features, such as, the number of images in which the feature is detected, the density of other features in the group, the strength of the detection of the feature, the strength of the match of the feature among different images, and the like, can be used in determining the priority.

At step 506, a reduced number of features is selected to form the selected subset of features. The selection includes culling or filtering of features, from respective groups, based upon the features' priority relative to the other features in the same group. Moreover, the selection may be based upon selecting only a predetermined maximum number of per partition features from each partition.

In some embodiments, an iterative technique may be employed where the sensitivity level of the feature detector is adjusted so that a larger proportion of the partitions have features to select from. However, although increased sensitivity of the feature detector can yield some features in areas where usable features are sparse, it can also result in a very large number of features in the more feature-rich areas. By culling based upon localized areas (e.g., partitions), embodiments can advantageously utilize such sensitivity adjustments to ensure a more equal distribution of features.

Figure 6:
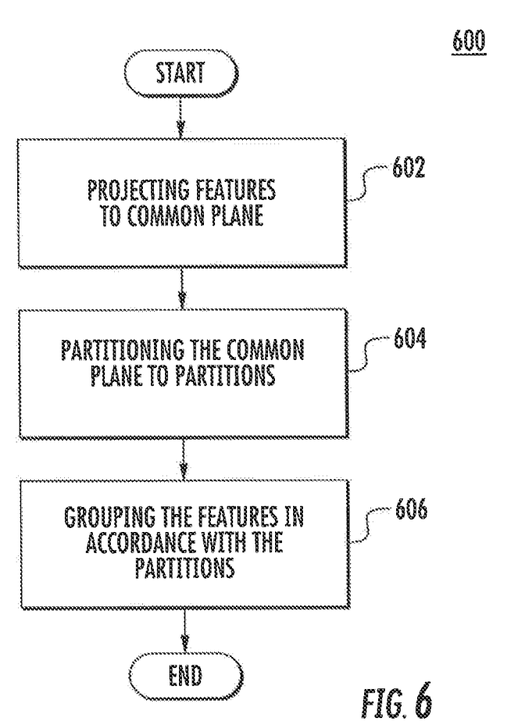
FIG. 6 illustrates a method for grouping image features, according to an embodiment.

FIG. 6 illustrates a method 600 for grouping matched image features, according to an embodiment. Method 600 may be used, for example, in performing step 502 of method 500. Method 600 may not require all of the steps 602-606, and may not require that the steps are performed in the illustrated order.

At step 602, the matched features are projected to a common plane. According to an embodiment, the oblique images that capture geographic features on the ground from the viewpoint of an aircraft, are mapped to the ground as the common plane. Mapping a feature to a common plane includes projecting a ray from the camera that captured an image through the feature, and then determining the intersection of the ray with the common surface. An example is shown in FIG. 1A. The location at which the ray associated with a feature intersects the common plane, may be referred to as the predicted 3D location of that feature. As described above in relation to FIG. 1A and elsewhere, the predicted 3D locations may, however, be inaccurate, and the subsequent bundle adjustment may operate to reduce the residual error between the respective predicted 3D locations and the actual observed 3D locations of each feature.

At step 604, the common plane is partitioned. In an embodiment, the common plane is partitioned to equal-sized square areas laid out as non-overlapping tiles. In general, the size of the square may be determined in accordance with the number of features desired in each square. Larger squares may result in a large number of features within each square, but a relatively small number of squares will be sufficient to cover the entire coverage area. Smaller squares, on the other hand, may each include only a relatively small number of features, but it may require a higher number of squares to cover the coverage area. Determining the partitions based upon the total number of partitions required and a number of per partition features, enables the partitioning to adapt to the different types of geographic characteristics.

At step 606, the features are grouped according to the partitions. The features that are mapped to the area within one partition are considered to belong to the same group.

Figure 7:
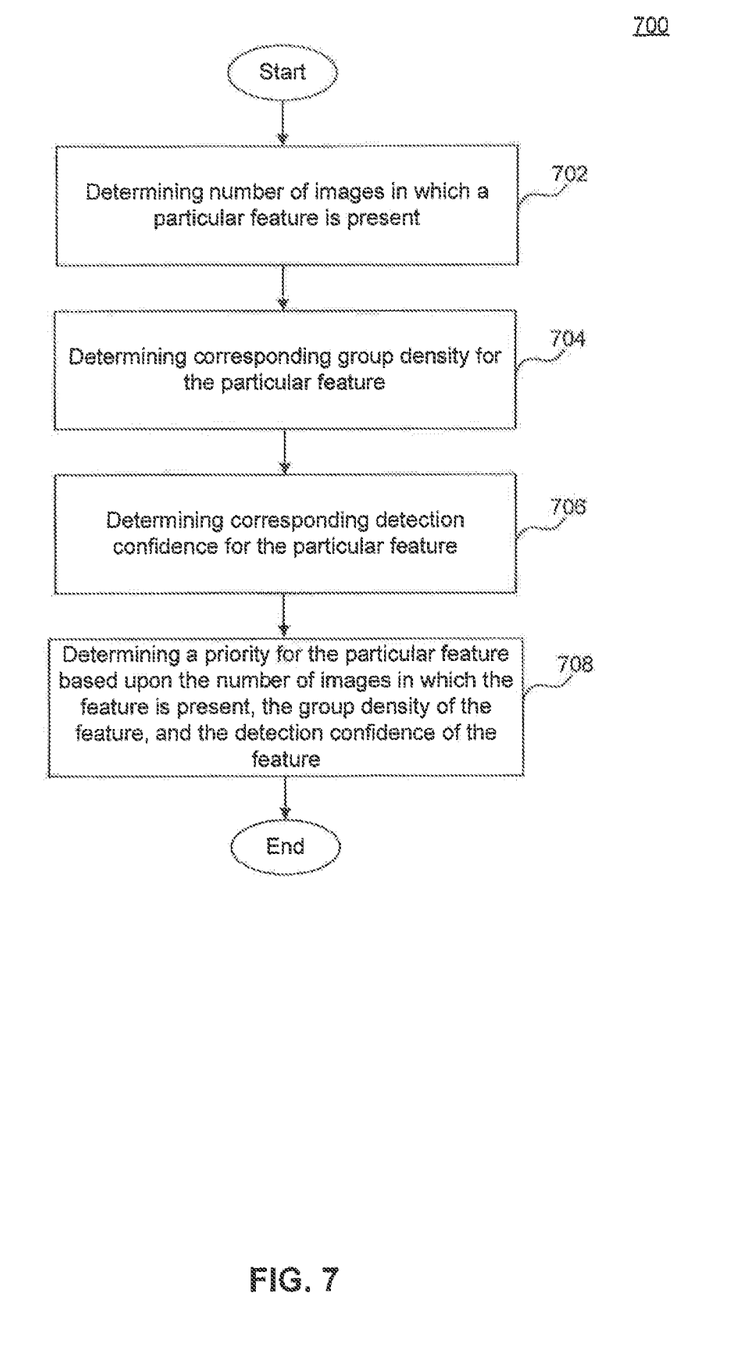
FIG. 7 illustrates prioritizing of image features, according to an embodiment.

FIG. 7 illustrates a method 700 for prioritizing image features, according to an embodiment. The prioritization of features achieved by method 700 can be used to cull some of the less desirable features from localized areas in a coverage area. Method 700 can be used, for example, in performing step 504 of method 500 described above. Method 700 may not require all of the steps 702-708 and may not require that the steps 702-708 are performed in the illustrated order.

At step 702, for each detected feature, it is determined how many images include that feature. The number of distinct images in which a particular feature is present, may be considered a measure of the effectiveness of that particular feature as a candidate for bundle adjustment. For example, the effectiveness of a feature as a candidate for bundle adjustment may increase in accordance with the number of images in which that feature appears increases.

At step 704, for each feature, an associated group density (also referred to as "local density") can be determined. According to an embodiment, the group density associated with a particular feature is the quantity (e.g., count) of other features that are in proximity to the particular feature. According to an embodiment, when the coverage area is partitioned into subareas (e.g., partitions), the group density may be the quantity of features in the subarea to which the particular feature belongs. In embodiments, a higher group density indicates, with respect to any one feature selected at random in that group, a lower likelihood of being selected for bundle adjustment. For example, in some embodiments, the features selected from any single subarea are limited to a maximum per partition threshold, and therefore, subareas with a greater number of features may have more of those features removed from consideration for bundle adjustment. Accordingly, for features in subareas with high levels of feature density, the priority assignment may be determined such that only a small number of features are assigned the highest levels of priorities. A maximum number of per partition features that can be selected may be configurable, or may be dynamically determined based upon factors, such as, but not limited to, the number of partitions, and a maximum total number of features that can be processed on a single processing node.

At step 706, at least one of, a detection confidence or match confidence is associated with a particular feature.

According to an embodiment, the detection confidence corresponds to the lowest level of sensitivity of the feature detector at which the particular feature was first detected. Thus, features detected at a low level of sensitivity may be considered as being associated with a higher detection confidence than features detected at a high level of sensitivity. According to another embodiment, with respect to a particular feature, the detection confidence may be associated with the ratio of the number of images that overlap the location of the particular feature, to the number of those images in which the particular feature is detected. Images at the same sensitivity level are considered for determining the ratio. According to another embodiment, the detection confidence may correspond to a combination of the ratio and the lowest detection sensitivity associated with that feature. The detection confidence may be produced by the feature detector. A high detection confidence (e.g., a lower detection sensitivity) may indicate a feature that has a high likelihood of selection for bundle adjustment.

A match confidence of a feature may indicate the strength of a match between that feature and corresponding features from one or more other images. According to various embodiments, for a particular feature, the associated match confidence may be based upon that feature's highest, lowest, or average, match confidence with corresponding features in any other images. Between corresponding features from two images, the match confidence may be a value proportional to the number of matching elements in the feature vectors representing the corresponding features. According to an embodiment, the match confidence may be produced by the feature matcher. In an embodiment, a higher match confidence indicates a feature that has a higher likelihood of being selected for bundle adjustment.

At step 708, a priority for respective features is determined using one or more of the determinations performed in steps 702, 704, and 706. According to an embodiment, a weighted combination of two or more of the above noted characteristics can be used to determine the priority of a feature.

The priority assigned to a feature, according to an embodiment, is a numeric value. The number of priority levels that are to be assigned to matched features may be configurable. According to embodiments, the number of priority levels can be chosen based upon, one or more of, the density characteristics of detected features (e.g., average density, distribution of density over subareas in the covered area), the density characteristics of matched features (e.g., average density, distribution of density over subareas in the covered area), and overlap characteristics of the images (e.g., average portion of an image that is overlapped).

Figure 8:
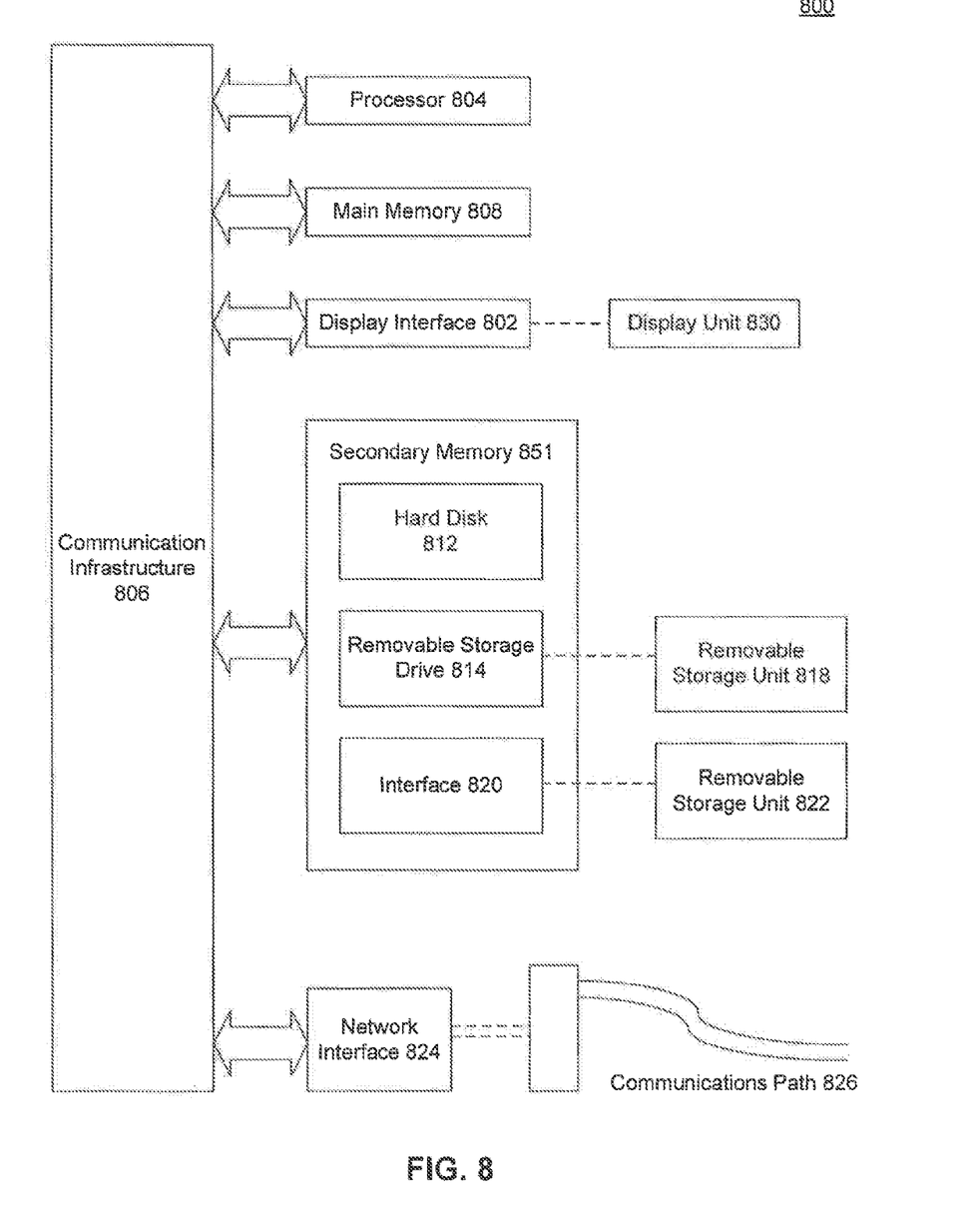
FIG. 8 illustrates an exemplary computer system, in accordance with an embodiment.

FIG. 8 illustrates an example computer 800 in which the embodiments described herein, or portions thereof, may be implemented as computer-readable code. For example, reduced feature bundle adjuster 302 or any of its modules can be executed on one or more computer systems 800 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 804 may be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme. Computer system 800 may also include display interface 802 and display unit 830.

Computer system 800 also includes a main memory 808, for example, random access memory (RAM), and may also include a secondary memory 810. Secondary memory 810 may include, for example, a hard disk drive 812, and removable storage drive 814. Removable storage drive 814 may include a floppy disk drive, a magnetic tape drive, an optical disk drive, a flash memory drive, or the like. The removable storage drive 814 reads from and/or writes to a removable storage unit 818 in a well-known manner. Removable storage unit 818 may include a floppy disk, magnetic tape, optical disk, flash memory drive, etc. which is read by and written to by removable storage drive 814. As will be appreciated by persons skilled in the relevant art, removable storage unit 818 includes a computer readable storage medium having stored thereon computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications p01t, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 818, removable storage unit 822, and a hard disk installed in hard disk drive 812. Computer storage medium and computer readable storage medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the embodiments described herein. In particular, the computer programs, when executed, enable processor device 804 to implement the processes of the embodiments, such as the stages in the methods illustrated by flowcharts of FIGS. 4-7, described above. Accordingly, such computer programs represent controllers of computer system 800. Where an embodiment is implemented using software, the software may be stored in a computer storage medium and loaded into computer system 800 using removable storage drive 814, interface 820, and hard disk drive 812, or communications interface 824.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for determining three-dimensional locations of features, comprising:
   receiving, by one or more computing devices, data associated with a plurality of images, wherein each of the plurality of images covers at least a portion of a geographic area;
   detecting, by the one or more computing devices, features contained within the plurality of images;
   determining, by the one or more computing devices, a plurality of matched features based on a comparison of the detected features contained within the plurality of images;
   selecting, by the one or more computing devices, a subset of the plurality of matched features, wherein each respective matched feature of the subset is selected based at least in part on a quantity of other matched features in proximity to the respective matched feature;
   determining, by the one or more computing device, three-dimensional positions associated with one or more of the matched features included within the selected subset; and
   in response to a request for the three-dimensional positions, providing, by the one or more computing devices, bundle adjusted information associated with the three-dimensional positions.

2. The computer-implemented method of claim 1, wherein selecting the subset comprises filtering, by the one or more computing devices, one or more of the plurality of matched features from each of one or more subareas of the geographic area such that a count of the plurality of matched features in each of the one or more subareas exceeds a threshold, wherein the subset includes ones of the plurality of matched features remaining after the filtering.

3. The computer-implemented method of claim 1, wherein selecting the subset comprises:
   adjusting, by the one or more computing devices, a sensitivity level for detecting the features contained within the plurality of images in order to increase the plurality of matched features present in one or more subareas of a plurality of subareas in the geographic area; and
   filtering, by the one or more computing devices, one or more of the plurality of matched features from each of the one or more subareas of the geographic area such that a count of the plurality of matched features in each of the one or more subareas exceeds a threshold, wherein the subset includes ones of the plurality of matched features remaining after the filtering.

4. The computer-implemented method of claim 3, wherein filtering the one or more of the plurality of matched features comprises:
   determining, by the one or more computing devices, for each of the plurality of subareas in which the count exceeds the threshold, a number of the matched features in the subarea to be removed, wherein the determination is based at least in part upon providing a substantially equal distribution of the subset over the plurality of subareas; and
   removing, by the one or more computing devices, the determined number of the matched features from each of the subareas in which the count exceeds the threshold.

5. The computer-implemented method of claim 1, wherein selecting the subset comprises:
   determining, by the one or more computing devices, a priority for respective ones of the plurality of matched features based at least in part upon a count of others of the plurality of matched features in proximity to the respective ones of the plurality of matched features; and
   selecting, by the one or more computing devices, the subset based at least in part upon the determined priority.

6. The computer-implemented method of claim 5, wherein determining the priority comprises determining, by the one or more computing devices, the priority of a particular matched feature of the plurality of matched features based at least in part upon a number of the images in which the particular matched feature is present.

7. The computer-implemented method of claim 5, wherein determining the priority comprises:
   grouping, by the one or more computing devices, the plurality of matched features according to their respective locations in the geographic area; and
   determining, by the one or more computing devices, the priority of a particular matched feature of the plurality of matched features based at least in part upon a number of other matched features of the plurality of matched features that are in the same group as the particular matched feature.

8. The computer-implemented method of claim 5, wherein determining the priority comprises determining, by the one or more computing devices, the priority of a particular matched feature based at least in part upon a detection confidence associated with the particular matched feature.

9. The computer-implemented method of claim 8, wherein the detection confidence is determined based upon at least one of a detection sensitivity level of a feature detector at which the particular matched feature is found to be present or a ratio of a number of images in which the particular matched feature is detected to a number of images which overlap an area including the particular matched feature.

10. The computer-implemented method of claim 5, further comprising:
projecting, by the one or more computing devices, the plurality of matched features onto a common plane, wherein the common plane encompasses the geographic area; and
partitioning, by the one or more computing devices, the common plane into a plurality of partitions.

11. The computer-implemented method of claim 10, wherein selecting the subset comprises selecting one or more of the plurality of matched features from respective ones of the partitions based upon the determined priority.

12. A system for determining camera parameters, the system comprising:
one or more computing devices including one or more processors and associated memory, the memory storing instructions that, when implemented by the one or more processors, configure the one or more computing devices to:
receive data associated with a plurality of images, wherein each of the plurality of images covers at least a portion of a geographic area;
detect features contained within the plurality of images;
determine a plurality of matched features based on a comparison of the detected features contained within the plurality of images;
select a subset of the plurality of matched features, wherein each respective matched feature of the subset is selected depending on a quantity of other matched features in proximity to the respective matched feature;
determine camera parameters associated with one or more of the matched features included within the selected subset; and
in response to a request for the camera parameters, provide bundle adjusted information associated with the camera parameters.

13. The system of claim 12, wherein the one or more computing devices are further configured to receive approximate camera parameters associated with the plurality of images, wherein the determined camera parameters correspond to refined camera parameters for the approximate camera parameters.

14. The system of claim 12, wherein the one or more computing devices are further configured to determine a priority for respective ones of the plurality of matched features, wherein the subset is selected based at least in part on the determined priority.

15. The system of claim 14, wherein the one or more computing devices are further configured to:
project the plurality of matched features onto a common plane, wherein the common plane encompasses the geographic area;
partition the common plan into a plurality of partitions; and
select one or more of the projected plurality of matched features from respective ones of the partitions based upon the determined priority.

16. The system of claim 14, wherein the one or more computing devices are further configured to determine the priority of a particular matched feature of the plurality of matched features based at least in part upon at least one of a number of the images in which the particular matched feature is present, a number of other matched features of the plurality of matched features that are in a common group as the particular matched feature or a detection confidence associated with the particular matched feature.

17. The system of claim 12, wherein the one or more computing devices are further configured to select the subset by filtering one or more of the plurality of matched features from each of one or more subareas of the geographic area such that a count of the plurality of matched features in each of the one or more subareas exceeds a threshold, wherein the subset includes ones of the plurality of matched features remaining after the filtering.

18. A tangible, non-transitory computer readable medium storing computer-executable instructions that, when executed by one or more processors, cause the one or more processors to perform operations, comprising:
receiving data associated with a plurality of images, wherein each of the plurality of images covers at least a portion of a geographic area;
detecting features contained within the plurality of images;
determining a plurality of matched features based on a comparison of the detected features contained within the plurality of images;
selecting a subset of the plurality of matched features, wherein each respective matched feature of the subset is selected based at least in part on a quantity of other matched features in proximity to the respective matched feature;
determining at least one of three-dimensional positions or camera parameters associated with one or more of the matched features included within the selected subset; and
in response to a request, providing bundle adjusted information associated with the at least one of the three-dimensional positions or the camera parameters.

19. The tangible, non-transitory computer readable medium of claim 18, further comprising determining a priority for respective ones of the plurality of matched features, wherein the subset is selected based at least in part on the determined priority.

20. The tangible, non-transitory computer readable medium of claim 19, further comprising:
projecting the plurality of matched features onto a common plane, wherein the common plane encompasses the geographic area;
partitioning the common plan into a plurality of partitions; and
selecting one or more of the projected plurality of matched features from respective ones of the partitions based upon the determined priority.

* * * * *